United States Patent [19]

Narasimhan et al.

[11] Patent Number: 4,771,418
[45] Date of Patent: Sep. 13, 1988

[54] TIME-SLOT ASSIGNER MULTIPLEXER

[75] Inventors: Subramanian Narasimhan, Santa Clara; Ronald Laugesen, Los Gatos, both of Calif.

[73] Assignee: Advanced Micro Devices, Inc., Sunnyvale, Calif.

[21] Appl. No.: 891,438

[22] Filed: Jul. 28, 1986

[51] Int. Cl.$^4$ .................. H04Q 11/04; H04J 3/12
[52] U.S. Cl. .................... 370/58; 370/110.1
[58] Field of Search ............ 370/85, 110.1, 58; 340/825.5

[56] References Cited

U.S. PATENT DOCUMENTS 4,627,047 12/1986 Pitroda et al. .................. 370/110.1
4,639,910 1/1987 Toegel et al. ................... 370/85
4,665,517 5/1987 Widmer ........................ 370/110.1

Primary Examiner—Douglas W. Olms
Assistant Examiner—Frank M. Scutch, III
Attorney, Agent, or Firm—Kenneth B. Salomon; J. Vincent Tortolano

[57] ABSTRACT

For each channel, a pair of buffers permits "non-slip" transfer of data signals on and off a bus synchronized with signals on a time-division multiplexed pulse-code modulation (PCM) highway. A source buffer consisting of a serial-in, parallel-out register and two parallel-in, parallel-out registers receives signals from one of the PCM channels and transmits these signals onto a bus synchronized with a data-routing multiplexer employed within a digital exchange controller employing the device. A destination buffer consisting of two parallel-in, parallel-out registers and a parallel-in, serial-out register receives signal from the bus and, in conjunction with a transmit multiplexer, generates the signals on the PCM highway.

8 Claims, 10 Drawing Sheets

TIME-SLOT ASSIGNER MULTIPLEXER

CROSS REFERENCE TO RELATED APPLICATIONS

Related, co-pending applications of particular interest to this invention are application Ser. No. 759,624, filed July 26, 1985, on behalf of Alan T. Clark and Arthur F. Lange entitled "Programmable Data-Routing Multiplexer", assigned to the assignee of the instant application, and application Ser. No. 759,622, filed July 26, 1985, on behalf of Alan T. Clark, Hadi Ibrahim and Arthur F. Lange entitled "Digital Subscriber Controller" assigned to the assignee of the instant application.

BACKGROUND OF THE INVENTION

Telephonic subscriber lines today are increasingly employing all-digital networks for both voice and data transmission so as to provide the utmost in signal integrity and flexibility inherent in digital networks. Further benefits accorded to the subscriber include the more efficient provision of existing and new services, such as telephony, packet- and circuit-switched data, telemetry, electronic mail, alarm signaling, telex, facsimile, and banking transactions over the same medium, thereby greatly reducing equipment and space requirements. Additionally, benefits accrue to the telephone company in terms of increased revenue derived from the provision of these new services, and simplified management resulting from all services operating on a single (digital) network.

To provide an interface to such all-digital voice/data networks on the subscriber's premises, the prior art has employed discrete and/or expensive custom circuitry which lacks the flexibility to meet changing subscriber needs. Furthermore such circuitry encourages proliferation of incompatible implementations which vary in physical, electrical and line protocol characteristics. Additionally, the prior art interfaces occupy large amounts of space, have high power consumption thereby generating considerable heat which requires cooling apparatus and lack the reliability of monolithic integrated circuitry.

SUMMARY OF THE INVENTION

The time-slot assigner multiplexer of the instant invention is illustrated in an application within a digital exchange controller (DEC). The DEC provides the exchange termination function at a subscriber ("S") interface for one integrated services digital network subscriber line and would typically reside in a private automatic branch exchange (PABX) "line card". An integrated circuit controller chip employing the instant invention allows the subscriber ready-access to the various data-handling facilities provided by all-digital voice/data telecommunication networks. The controller can be programmed by the subscriber via an external 8-bit microprocessor to perform a number of functions by giving simultaneous access to two 64-kilo-bit per second (kbs) voice/data ("B1" and "B2") channels and a 16-kbs data control ("D") channel. Voice-band signals are digitized at the subscriber's terminal and transmitted over one of the 64-kbs channels. Access is also provided to the PABX "backplane" via a dual pulse code modulation ("PCM") highway.

Among the six functional units within the controller are a line interface unit which connects the controller via a pair of isolation transformers to the network transmission line; a data link controller which receives control and data information from the line interface unit and transmits subscriber-generated control and data information to the line interface unit for subsequent transmission over the network; a time-slot assigner which provides time-slot assignment to the dual PCM highway of the signals received at, and transmitted to, respectively, the B1-, B2-, and D-channels; a microprocessor interface which permits subscriber control of the function and data paths within the controller; an intermediate digital interface which allows B- and D-channel data signals to be received at, and transmitted to, a serial data in, and a serial data out, port respectively of the controller; and a multiplexer which, as commanded by the subscriber via the external microprocessor, establishes data paths between several possible source and destinations including the line interface unit, the time-slot assigner, the microprocessor interface and the serial ports. Furthermore, the subscriber-programmable multiplexer controls the time-multiplexing of the two voice/data serial channels.

The time-slot assigner includes the time-slot assigner multiplexer (TSA-MUX) of the instant invention. The TSA-MUX performs three functions: data-routing between the B1-, B2-, and D-channels and the dual PCM highway; rate adaptation of the PCM highway clock which operates between 64 kHz and 8.192 mHz and the 192 kHz of the "S" interface; and synchronization of the 8 kHz PCM highway with the DEC.

The TSA-MUX includes three sets of eight-bit registers--one each of the three B1-, B2-, and D-channels. An eight-bit shift register generates a delayed frame synchronization (TSPFS) signal from the 8 kHz frame synchronization (PFSN) signal on the PCM highway. "One-shot" time-slot receive and transmit load (TSRLD and TSXLD, respectively) signals are generated for loading buffers for the three channels within the TSA-MUX. The TSA-MUX provides subscriber-selection of one of two receive paths (DRA and DRB) and one of two transmit paths (DXA and DXB).

An 8 kHz frame of the PCM highway can be selected from one to seven PCM clock (PCLK) periods beyond the next PFSN signal, because the time-slot assignor allows independent selection of a time-slot (TS) and a clock-slot (CS) on the PCM highway; from TS=0 to TS=127 and CS=0 to CS=7. To maintain proper frame alignment, the internal frame synchronization signal TSPFS is delayed eight PCLK clock periods with respect to the PFSN clock.

Data is shifted into serial-to-parallel registers within the TSA-MUX source buffers during an eight-bit wide time-slot control receive (TSCR) pulse. The one-shot TSRLD signal, generated off the trailing edge of the TRSC pulse, is used to download the contents of the serial-to-parallel register into an intermediate register within the buffers. In turn, data from the intermediate register is downloaded into a source register portion of the buffers during the delayed frame synchronization TSPFS signal. The source registers are connected to a data (MXD) has within the TSA-MUX.

Transfer of data signals on and off the MXD bus is controlled by timing signals generated by a time-slot generator portion of the time-slot assigner: multiplexer source (MX2SETX) signals are used to enable the contents of the source register to be generated onto the MXD bus and multiplexer destination (MX2DETX) signals are used to enable the signals on the MXD bus to be generated into destination buffer the destination buffer portion of the TSA-MUX.

Signals from the MXD bus are received by a first destination parallel register with the destination buffer and downloaded to an intermediate register during reception of the delayed frame synchronization (TSPFS) signal. The one-shot TSXLD signal, generated off the trailing edge of an eight-bit wide time-slot control transmit (TSCX) pulse, is used to download the contents of the intermediate register into a serial-to-parallel regiser with the destination buffer. In turn, data is shifted out of the serial-to-parallel register onto a TSAXDATA or a TSBXDATA port of the TSA-MUX during the eight-bit wide TSCX pulse.

The TSPFS signal is synchronized with a 6.144 mHz clock internal to the TSA-MUX to generate an 8 kHz signal (FSYNC8) which is used by the remaining portions of the DEC. The MX2SETX and MX2DETX signals are derived from the FSYNC8 signal to ensure frame synchronization. Accordingly, if the PCM input frame synchronization (PFS) signal is within specified limits of ±100 ppm, the DEC timing is locked to the PFS signal and the integrity of data to and from the multiplexer, line interface unit and intermediate digital interface portion of the DEC is guaranteed.

DETAILED DESCRIPTION OF THE PREFERRED EMBODIMENT

A. General

Figure 1:
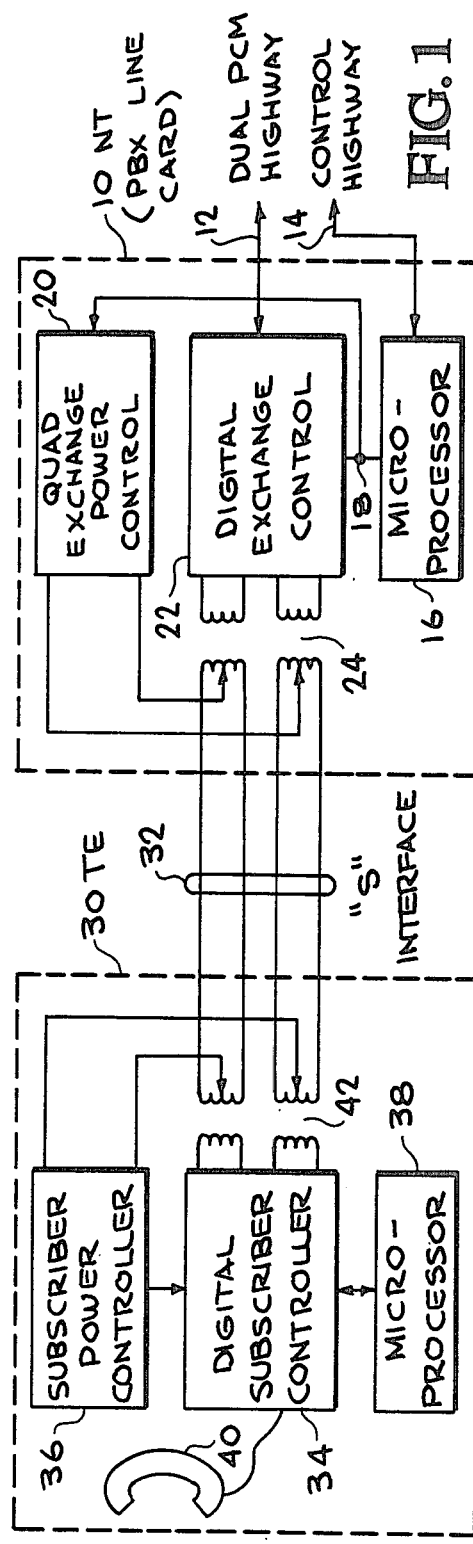
FIG. 1 illustrates employment of a digital exchange controller (DEC) connected to a telephone network local end office via a 192 kbs four-wire interface.

The International Telephone and Telegraph Consultative Committee (CCITT) has recommended a set of standards for digital subscriber access over common interfaces, CCITT I-Series Recommendations which are incorporated herein by reference. A familiarity with these recommendations is useful in understanding the present invention. FIG. 1 illustrates a typical CCITT "S" interface at the subscriber's premises in which a network terminating (NT) element such as the private automatic branch exchange (PABX) line card 10 illustrated is connected to the telephone network local end office via a dual pulse code modulation (PCM) highway 12 carrying simultaneous digital voice and data and a microprocessor control highway 14 carrying microprocessor control signals. The subscriber will have access to two 64 kilo-bit per second (kbs) voice/data ("B") channels and one 16 kbs control/data ("D") channel time-multiplexed bit streams carried on the PCM highway 12.

The PABX line card 10 contains a microprocessor (MPC) 16 which receives the control signals on the control highway 14 and uses them to control the other elements on the line card via signal lines 18. These elements include a quad exchange power controller (QEPC) 20 and a digital exchange controller (DEC) 22.

Figure 2:
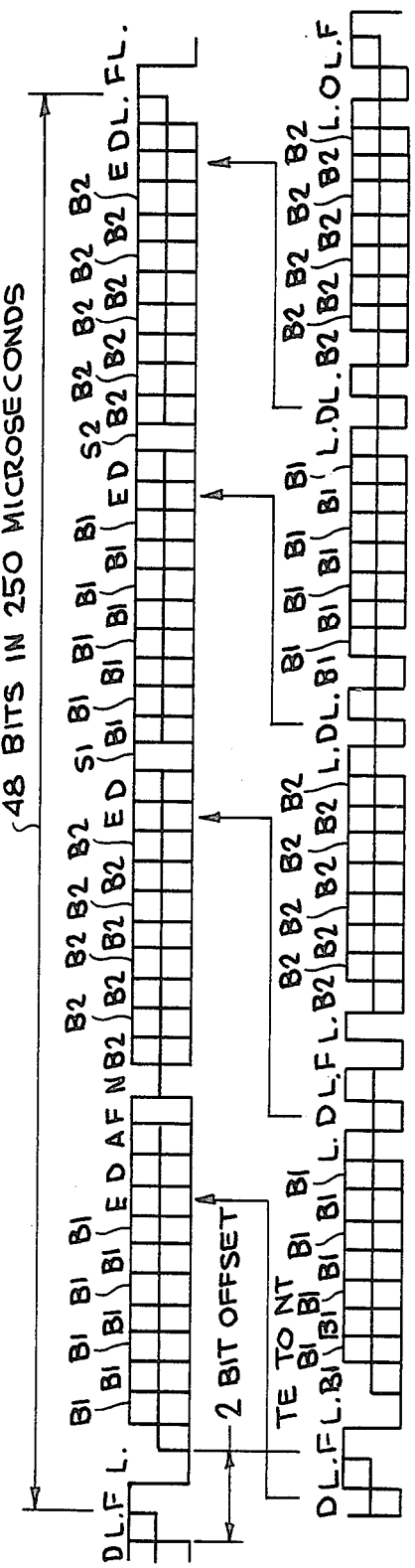
FIG. 2 illustrates the CCITT international standard "S" frame structure.

The PABX line card 10 is connected to the subscriber's terminal equipment (TE) 30 at a full-duplex CCITT four-wire standard ("S") interface 32. This interface implements the CCITT "I"-series recommendations regarding physical, electrical, and line protocol characteristics: it operates at 192 kbs comprising a 64 kbs voice/data "B1" channel, a 64 kbs voice/data "B2" channel, a 16 kbs control/data "D" channel, and a 48 kbs channel carrying frame and maintenance information. The information on the "D" channel control packet follows the LAPD protocol as defined in the CCITT recommendation. The "S" interface frame structure, containing 48 bits with a period of 250 microseconds is illustrated in FIG. 2. The frame is transmitted as a pseudo-ternary code containing framing, DC balancing and contention resolution (D echo bit) for the so-called "point-to-multipoint" configuration of the CCITT recommendation.

The TE 30 contains at its heart a digital subscriber controller (DSC) 34, which supports a variety of "special feature" telephones and provides access to the data-handling facilities present at the "S" interface 32. DSC 34 is the subject of the related, co-pending application entitled "Digital Subscriber Controller" and its description therein is incorporated herein by reference. The DSC 34 can be employed as a microprocessor peripheral to develop the TE 30 as a full workstation. Both the DEC 22 and DSC 34 separate and combine the "S" interface frame of FIG. 2 into the two 64 kbs "B1" and "B2" channels and the 16 kbs "D" channel, and that frame structure shown in the upper portion of FIG. 2 is used to transmit data from DEC 22 to DSC 34, while that shown in the lower portion of FIG. 2 is used to transmit data from DSC 34 to DEC 22.

The TE 30 also includes a subscriber power controller (SPC) 36 and a microprocessor 38. A shown in FIG. 1, in a typical application, TE 30 includes a handset 40 having an earpiece speaker and a mouthpiece microphone connected to the DSC 34 of the instant invention. As mentioned, the DSC supports a wide range of other transducers of either the analog or digital variety.

The full-duplex four-wire "S" interface 32 terminates at a pair of isolating transformers 24 and a pair of isolating transformers 42 connected to the DEC 22 and the DSC 34, respectively. One pair of wires of the four-wire interface 32 comprises a transmit circuit from the DEC 22 to the DSC 34, the other pair of wires comprises a receive circuit from the DSC 34 to the DEC 22.

Figure 3:
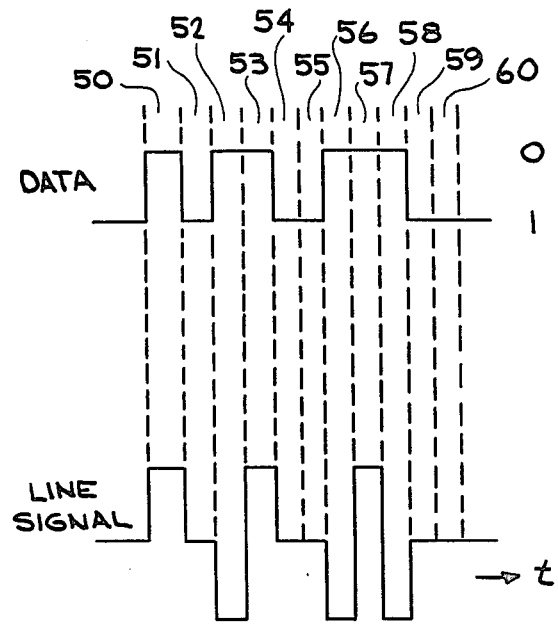
FIG. 3 illustrates the pseudo-ternary coding employed during transmission over the "S" interface.

For both directions of transmission over the "S" interface 32, pseudo-ternary line coding is used with 100% pulse width, as is illustrated in FIG. 3. In this method of coding, data having a value of binary ONE is represented by a space, i.e., zero voltage, in the line signal, such as time slots 51, 54, 55 and 58 of FIG. 3.

Data values of binary ZERO are represented by either a high (positive) voltage mark or a low (negative) voltage mark, with the marks alternating in polarity so as to reduce dc offset on the line, such as time slots 50, 52, 53, 55, 56 and 57 of FIG. 3. In this code, any two consecutive high marks or two consecutive low marks represent a code violation which can be used for framing or error detection.

Figure 4:
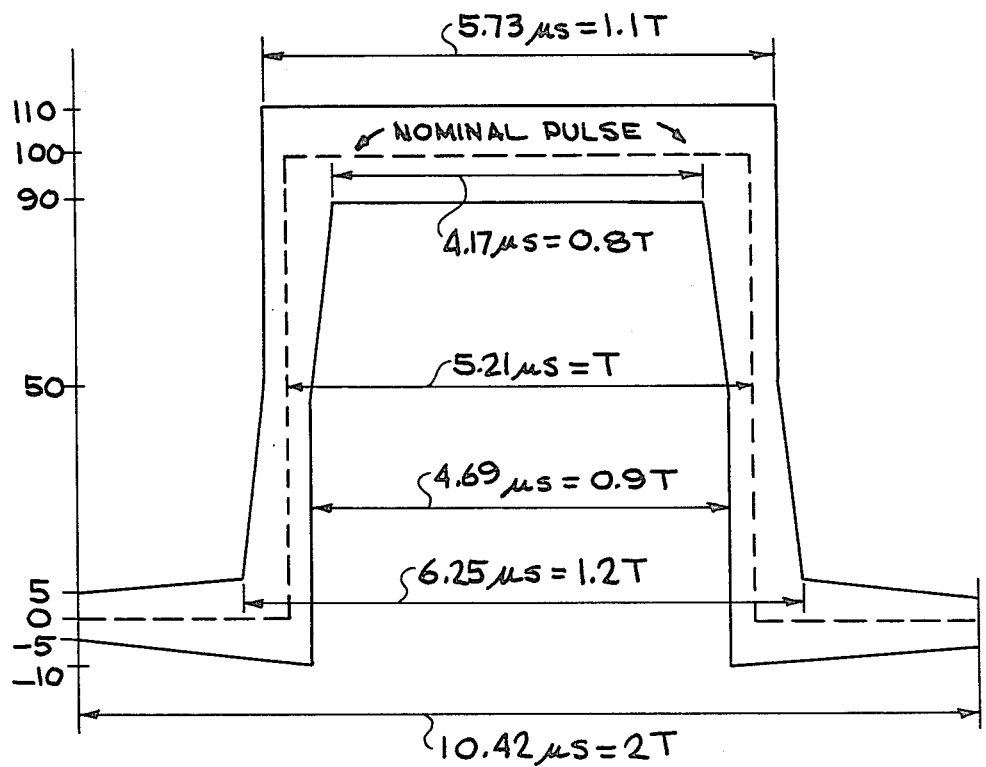
FIG. 4 illustrates the pulse mask used by the transmitter portion of a digital subscriber controller (DSC).

A transmitter portion of the DSC 34 generates at the output winding of transformer 42 100 per cent pseudo-ternary coded pulses conforming to the pulse mask shown in FIG. 4. The same pulse mask is used for both the high and low marks.

B. The Frame Structure

In both directions of transmission, on the transmit circuit from the NT 10 to the TE 30, and on the receive circuit from the TE 30 to the NT 10, the bit-stream is grouped in frames of 48 bits, each as illustrated in FIG. 2. The frame structure is identical for both "point-to-point" and "point-to-multipoint" configurations. Each frame is transmitted at 4 kHz and consists of several groups of bits, as identified in FIG. 2 and described in the following Tables.

The upper portion of FIG. 2 contains the bit-stream frame structure of the NT 10 to TE 30 transmit circuit.

Table I, below, contains a description of groups of bits according to their position within the frame. Each individual group is dc-balanced by a trailing balance bit, L-bit.

TABLE I

| TE to NT Frame Structure | |
|---|---|
| bBit Positions | Group |
| 1 and 2 | Framing signal with balance bit |
| 3 to 11 | B1-channel with balance bit |
| 12 and 13 | D-channel with balance bit |
| 14 and 15 | Auxiliary framing/space bit with balance bit |
| 16 to 24 | B2-channel with balance bit |
| 25 and 26 | D-channel bit with balance bit |
| 27 to 35 | B2-channel with balance bit |
| 36 and 37 | D-channel bit with balance bit |
| 38 to 46 | B2-channel with balance bit |
| 47 and 48 | D-channel bit with balance bit |

The lower portion of FIG. 2 contains the bit-stream frame structure of the NT 10 to TE 30 receive circuit. Frames transmitted by the NT 10 contain an ECHO ("E") channel used to retransmit the D-bits received from the TE 10. This channel is used for D-channel access control. The last ("L") bit of the frame is used for balancing each complete frame.

TABLE II

| NT to TE Frame Structure | |
|---|---|
| Bit Position(s) | Group |
| 1 and 2 | Framing signal with balance bit |
| 3 to 10 | B1-channel |
| 11 | E-channel bit |
| 12 | D-channel bit |
| 13 | Bit S[1] used for activation |
| 14 | Auxiliary framing (FA) bit |
| 15 | N bit-set to binary one |

TABLE II-continued

| NT to TE Frame Structure | |
|---|---|
| Bit Position(s) | Group |
| 16 to 23 | B2-channel |
| 24 | E-channel bit |
| 25 | D-channel bit |
| 26 | Bit S[2] used for activation |
| 27 to 34 | B1-channel |
| 35 | E-channel bit |
| 36 | D-channel bit |
| 37 | Zero bit |
| 38 to 45 | B2-channel |
| 46 | E-channel bit |
| 47 | D-channel bit |
| 48 | Frame balance bit |

The DEC can be operated in four different modes:

(1) A DEC-PABX mode is for use in a PABX line card 10, such as is illustrated in FIG. 1. In this mode, the DEC 22 provides an interface between the dual PCM highway 12 and the "S" reference point.

(2) A DEC-LT (line termination) mode is for use in a central office line card. The DEC 22 connects to the dual PCM highway and interfaces to a TEC (Transceiver Echo Canceller) via an IDI (Intermediate Digital Interface) portion of DEC 22 to drive a "U" reference point.

(3) A DEC-NT (Network Termination) mode is used in a simple NT application. The DEC 22 connects to a TEC via the IDI to provide a connection between the "U" and "S" interfaces.

A DEC-INNT (Intelligent NT) mode is for use in an NT which contains more than one each of "U" and "S" interfaces. It allows building a small keysystem. The DEC 22 is connected to the dual PCM highway 22 and to a TEC via the IDI interface.

In the DEC-PABX and DEC-NT modes, the DEC 22, via the "S" reference interface 12, supports the 192 kbps four-wire path to the subscriber TE 30 operating in either the "point-to-point" or "point-to-multipoint" configurations. The DEC 22 separates and combines the 192 kbps data stream into separate D- and B-channels and via the MPC 16 inserts or extracts these channels on or off the PCM highway 12 in a user-programmable time slot.

The D-channel can be processed, level 1 and partial level 2, in the DEC 22 and then conducted via a parallel interrupt-driven bus to the MPC 16 for higher level processing, or the D-channel can be conducted over the dual PCM highway 12 with the B-channel data for centralized handling. A user can employ the MPC 16 to program the DEC 22 to route the D- and B-channels as desired and the MPC 16 maintains supervision by interrogating status, error and interrupt registers contained with the DEC 22.

The DEC 22 contains an interface to the dual PCM highway 14 providing independent control of the transmit and receive paths for use in the DEC-PABS, DEC-LT and DEC-INNT modes. A frame sync (FS) signal identifies the beginning of the frame and all time-slots are referenced to it. The PCM interface operates at up to 8.192 MBPS, allowing for timeslots at 64 kbps on either of two PCM highways for a total of 256 channels. During each frame two 64 kbps B-channels [8-bit timeslots] and one 16 kbps or 64 kbps D-channel [2- or 8-bit timeslot] may be transferred to/from the PCM highway 12. Time-slot assignment and PCM highway selection is under program control of the PMC 16.

To aid in the maintenance of the system, several facilities are provided. Loopback is available at the "S" 32, PCM 12 and IDI interfaces. The B-channels may be accessed via the MPC interface 18. The D-channel processor may be tested independently by loopback to the MPC interface 18.

Figure 5:
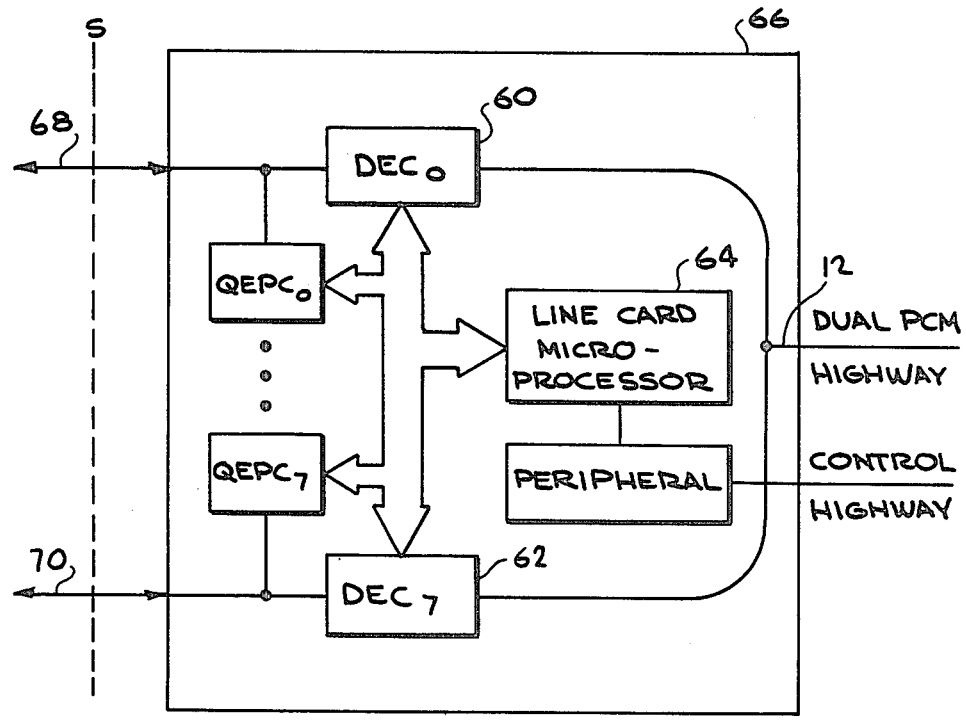
FIG. 5 illustrates an eight-channel private automatic branch exchange (PABX) line card employing eight DECs.

A number of DECs, such as eight (DEC0 60, ... DEC7 62) under the control of one MPC 64 can be contained on one PABX line card 66 as illustrated in FIG. 5. Eight "S" reference interface lines 60, ..., 70 can be terminated on the one PABX line card 66 with the PMC 64 controlling the time-slot assignments, activation and maintenance functions.

The MPC 64 may be connected to the line card 66 "backplane" in three ways. By connecting a parallel MPC bus directly to the backplane, via a serial bus to the backplane, or over the dual PCM highway 12 via one of the DECs 60, ..., 62.

A transmitter section of a line interface portion of the DEC 22 generates the multiplexed signals on the B1, B2, D and S/FA - channels in accordance with the frame structure of FIG. 2. The transmitter section then transmits these signals at the "S" interface 32. The line interface transmitter reflects the received D-channel bit when the DEC 22 is in the DEC-PABX mode. In the DEC-NT mode the E-channel bit is generated by the IDI.

A receiver section of the line interface portion performs filtering, bit-timing extraction, frame synchronization and framing error indication, and thresholding/slicing of input data.

B.1. Frame Alignment Procedure in the Direction NT 10 to TE 30

The DEC 22 forces bit position 14, the FA bit, to a binary ZERO. If no ZEROs are transmitted by the DEC 22 in bit positions 3 through 13, the FA bit is forced to a low mark; in all other cases, the FA bit is generated in accordance with the pseudo-ternary code. Accordingly, a code violation will occur within 13 bits from the framing bit.

The TE 30 searches for line code violations. Having detected a violation, a count of the number of bits until the next violation is initiated. If the count is 13 or less, the distance between the framing and auxiliary framing bits, then the first violation is taken to indicate the true framing position. For any other count value, it is assumed that true framing has not been achieved and the TE 30 continues to search.

The line interface portion of the DSC 34 generates a loss-of-framing signal when a time period equivalent to two 48-bit frames has elapsed without detection of valid pairs of code violations according to the greater-than-or-equal-to .13 criterion described. The DSC 34 halts transmission immediately upon generation of this signal.

When the line interface portion of the DSC 34 receives three consecutive pairs of line code violations, obeying the criterion described, the line interface unit generates a signal indicative of the fact that the TE 30 has achieved synchronization.

B.2 Frame Alignment Procedure in the Direction TE 30 to NT 10

The DSC 34 performs frame alignment in the same manner as just described except that, since the line interface portion of the DEC 22 uses fixed timing, the FA bit is set in accordance with a buffer internal to the line interface portion of the DSC 34. If this buffer is loaded with a ZERO, the DCS 34 generates a low mark at the FA bit position for transmission in the TE 30 to NT 10 direction.

B.3 D-Channel Access Protocol

The DSC 34 employs D-channel access protocol which allows for a number of TE's connected in a "point-to-multipoint" configuration to gain access to the D-channel in an orderly fashion. The procedure ensures that even in cases where two or more TE's attempt to access the D-channel simultaneously, one TE will always be successful in completing the transmission of its information. The procedure also permits the TE's to operate in the point-to-point configuration.

Information on the D-channel is transmitted in Layer 2 frames delimited by flags consisting of the binary pattern 011111110. When no TE has information to transmit, the condition on the "S" interface consists of all "ONE"s in both directions of transmission.

The DSC 34 is provided with an echo (E)-channel which permits a TE 30 attached to the DSC to monitor the traffic on the D-channel. An NT 10, on receipt of a D-channel bit from the TE or TE's 30 connected to NT 10, reflect this condition in the transmission toward the TE or TE's in the next-available E-channel bit position.

After a period of time equal to a predetermined number of D-channel bit periods, "X", if the condition of the E-channel remains all binary ONE's, the TE 10 is cleared for transmission. If a binary ZERO occurs during this sensing state, the TE resets its counter and continues to monitor the D-channel. While transmitting information on the D-channel, the TE monitors the received E-channel bit stream and the DLC within the DSC of the TE compares the last transmitted bit with the next received E-bit. If the bit transmitted is the same as the received echo bit, the TE continues transmission. If, however, the received echo is different, the TE creates transmission and returns to the D-channel sensing state.

A TE which has successfully completed the transmission of a Layer 2 frame, increments the contents of its counter, "X", to a value "X+1" and returns to the D-channel sensing state. The counter is reset to "X" when "X+1" binary ONE's have been detected on the E-channel.

FIG. 5 illustrates an application of DEC 22 in an eight-channel private automatic branch exchange (PABX) line card associated with one "S" interface. The line card employs eight DECs, two of which, DEC 60 and DEC 62, are illustrated in FIG. 5. A single line card microprocessor (MPC) 64 is employed, supplying in common to all eight DECs, control signals received on the control highway, as described in connection with FIG. 1.

The line card MPC 64 is illustrated in FIG. 5 as including a separate block labelled PERIPHERAL providing connection to the control highway. Each of a pair of Quad Exchange Power Controllers (QEPCs) provides power to four of the DECs. The "S" interface, carrying the full-duplex signals over eight lines, two of which 68 and 70 are illustrated, is to the eight DECs.

The eight-channel line card 66 illustrated in FIG. 5 shows the possible routes of the multiplexed signals carried on the B1, B2 and D-channels through the line card microprocessor 64. These signals are received from and transmitted to the TE 30 (FIG. 1) over the "S" interface. The B-channels to or from the "S" interface can be routed directly to the line card MPC 64 or over the dual PCM highway 12 via the DECs. As with the signal lines 68 and 70, all eight of DECs are connected to the dual PCM highway 12, although only DECs 60 and 62 are shown in FIG. 5 as connected to PCM highway.

When a D-channel packet is received from the TE 30, the line card MPC 64 can pass the packet over the dual PCM highway 12 for prcessing by circuitry not on line card 66, or it can pass the packet, via a DEC, to the line card MPC 64 for processing on the line card 66, Conversely, when a D-channel packet is transmitted over the "S" interface to the TE 30 it can enter a DEC on line card 66 directly from the dual PCM highway 12, or from the line card MPC 64.

The line card MPC 64 can communicate with a central computer (not shown) controlling several line cards 66 by transmitting and receiving data over the dual PCM highway 12 via a DEC.

B.4 Activation/Deactivation

When the line interface portion of the DSC 34 detects activity on the S-interface 32, the DSC 34 performs the CCITT activation procedure and, upon reception of the Info 4 signal, generates a signal which causes the MPC 38 to undergo an interruption. The line interface portion of the DSC 34 will continue transmission of the framing, but will cease if it receives a deactivation signal from the DEC 22, although the line interface portion will remain fully synchronized as long as NT 10 is transmitting framing. Table III, below, summarizes the DSC 34 activation/deactivation signal procedures. As shown, for an NT 10 to TE 30 activation, the procedure starts with an Info 2 signal from NT 10 TE 30. Info 1 is only used when the TE 30 initiates activation. Info 1 will cease being transmitted from TE 30 when Info 2 is recognized by NT 10, and Info 3 will be transmitted from TE 30 after synchronization is assured.

TABLE III

| Activation/Deactivation Signals | |
|---|---|
| Signals from NT 10 to TE 30 | Signals from TE 30 to NT 10 |
| Info 0 - No signal | Info 0 - No signal |
| Info 2 - Frame with all bits of the B, D, and D-echo channels set to binary ZERO. N and L bits according to the normal coding rules. Bit A set ZERO. | Info 1 - Continuous signal with the pattern: positive ZERO, negative ZERO, six ONE's. Normal bit rate of 192 kbs. |
| Info 4 - Frame with operational data on B, D, and D-echo channels. Bit A set to binary ONE. | Info 3 - Synchronized frames with operational data on B and D channels. |

C. DEC Architecture

Figure 6:
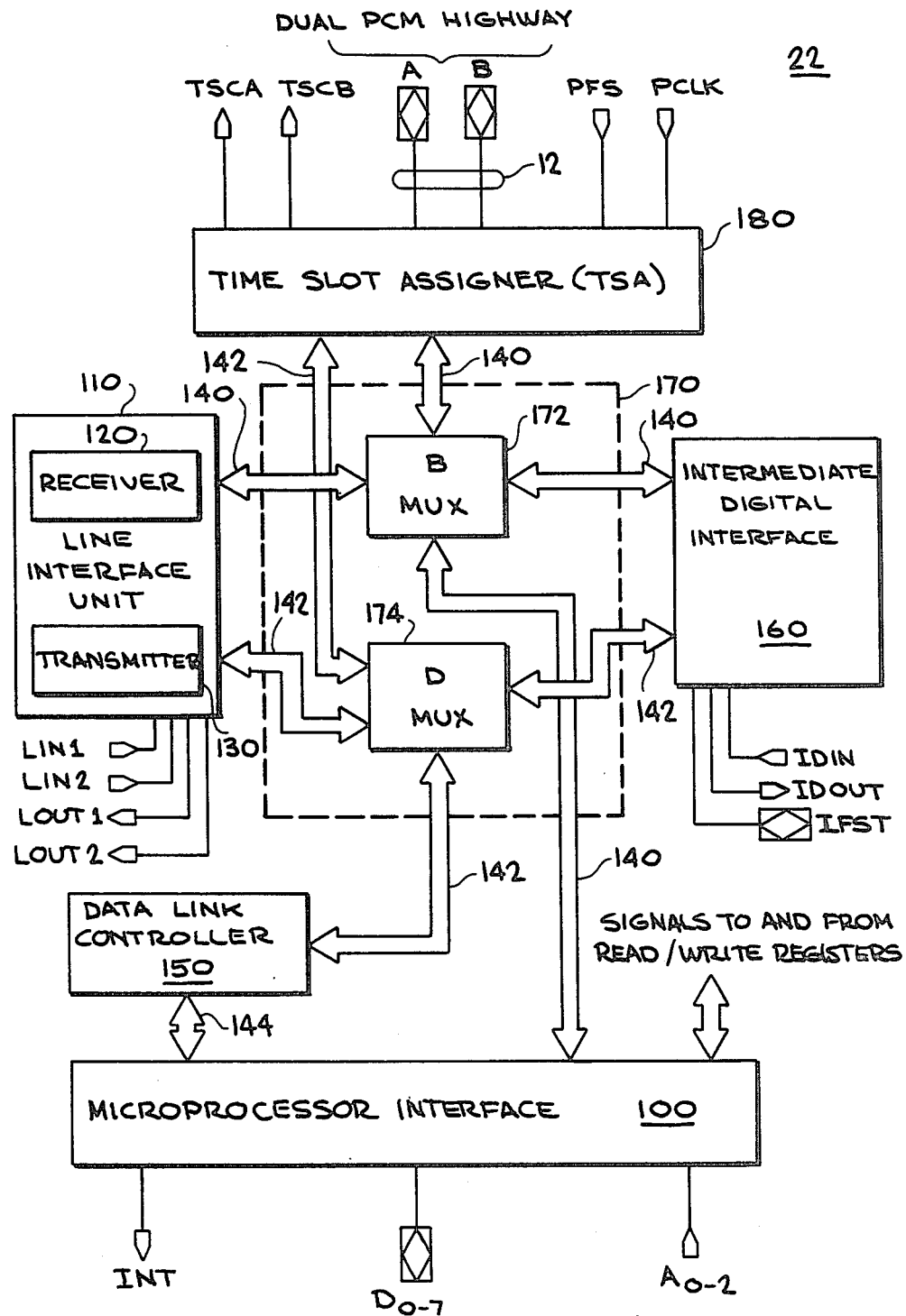
FIG. 6 is a functional block diagram of the DEC employing a time-slot assigner (TSA) of the instant invention illustrating the logical bus structure of the device.

The digital exchange controller (DEC) 22 consists of seven functional blocks, as illustrated in FIG. 6. The DEC provides an exchange termination function for a single digital subscriber access to a telephone network. The DEC is compatible with the CCITT I-series recommendations at reference point "S". Accordingly, the user of the DEC may design PABX line cards which conform to international standards.

With reference to FIG. 6, DEC 22 provides a 192 kbs full-duplex digital path for bit-streams received via isolation transformer (24, FIG. 1) on the four-wire "S" interface (32, FIG. 1) at terminals LIN1 and LIN2, and transmitted on the four-wire interface from terminals LOUT1 and LOUT2. The DEC separates the received bit-stream into the B1 and B2 channels (each 64 kbs), and the D channel (16 kbs). The B channels are routed to different ones of the functional blocks illustrated in FIG. 6 under user control. The D-channel is partially processed at the Level 2 in the DEC 22 and passed via a microprocessor interface (MPI) 100 to a microprocessor (16, FIG. 1) for additional processing. The description of the microprocessor interface (MPI) contained in the related, co-pending application "Digital Subscriber Controller", is incorporated herein by reference and applies to the MPI 100 of the DEC 22. The DEC 22 of the present invention supports both of the two major CCITT recommendations, "point-to-point" and "point-to-multipoint" subscriber configurations, to meet both PBX and public applications.

With reference to FIG. 6, the DEC 22 includes a line interface unit (LIU) 110 which contains a receiver section 120 connected to the terminals LIN1 and LIN2 and a transmitter section 130 connected to the terminals LOUT1 and LOUT2. LOUT2. The description of the LIU contained in the related, co-pending application "Digital Subscriber Controller", is incorporated herein by reference, and applies to the LIU 110 of the DEC 22 except in that the latter LIU 110 is operable in two modes; one for adaptive timing used in the "extended passive bus" and "point-to-point" configuration and another for fixed timing used in the "short passive bus" configuration.

A set of four busses, denoted collectively as bus 140, is shown in FIG. 6 connecting all various of the elements thereon and conducts B- and S/FA- channel data. The DEC 22 also includes a data link controller (DLC) 150 connected to a bus 142 which partially processes the 16 kbs D-channel received via the LIU 110. A set of four busses, denoted collectively as bus 142, is shown in FIG. 6 connecting various of the elements thereon, and conducts D-channel data. The description of the DLC contained in the related, co-pending application "Digital Subscriber Controller" is incorporated herein by reference and applies to the DLC 150 of DEC 22. A bus 144 connects the DLC 150 directly to the MPI 100.

An intermediate digital interface (IDI) 160 portion of the DEC 22 is connected to the bus 140. IDI 160 allows B- and D-channel data to be received and transmitted at an IDIN and IDOUT terminal, respectively, of DEC 22. An IDI frame synchronization signal (IFS) is communicated at an IDI frame synchronization terminal (IFST).

A data-routing multiplexer (MUX) 170 portion of the DEC 22 is externally programmable via the microprocessor 16 and, in response, controls the multiplexed bit-streams on the B1- and B2-channels and the D-channel which are received and transmitted to external peripheral devices from the DEC 22. The MUX 170 can be programmed to establish a variety of different signal paths via the busses 140 and 142 having source and destinations, including: the dual PCM highway, the PIM 100, the LIU 110, the DLC 150, the IDI 160 and the TSA 180. The MUX 170 of FIG. 6 includes a B-MUX portion 172 which selectively routes the 64 kbs B1 and B2 and S/FA channels among the MPI 100, LIU 110, the IDI 160, and the TSA 180 with internal logical channels designated thereon as Ba, Bb and S/FA (for the MPI), B1, B2 and S/FA (for the LIU and IDI), and B1 and B2 (for the TSA). The MUX 170 also includes a D-MUX portion 174 which selectively routes the D-channel among the MPI 100, LIU 110, the TSA 180, the IDI 160 and the DLC 150.

A data-routing multiplexer is the subject of a related co-pending application Ser. No. 759,624, filed July 26, 1985 on behalf of Alan T. Clark and Arthur F. Lange, entitled "Programmable Data-Routing Multiplexer," and assigned to the assignee of the instant application. The detailed description of the multiplexer and the multiplexer control registers and related elements within the multiplexer is contained in that related co-pending application and incorporated herein by reference, and applies to MUX 170 of DEC 22 except that the MUX 170 also routes the D-channel to the TSA 180, the IDI (160, or the LIU 110 from the DLC 150 and vice-versa and also allows direct transfer of the D-channel data between two of the three elements, the TSA, the IDI and the LIU bypassing the DLC 150.

A time-slot assigner (TSA) 180 of the instant invention is connected to bus 140, provides time-slot assignment for B1 and/or B2 voice/data channel information and D-channel information transmitted and received over the dual PCM highways A and B 12 connected to TSA 180. Signals from MPI 100 may also be transmitted over PCM highway 12 via TSA 180. The transmit and receive time-slot assignment is user-programmable via MPI 100. All the DEC 22 elements of FIG. 6 are synchronized to a clock (PCLK) dervied from the PCM highway 12 and the 8 KHz frame synchronization (PFS) identifying the start of a PCM frame. TSA 180 will be described hereinafter in detail.

D. DSC Programmable Internal Bus Structure

The MUX 170 contains three multiplexer control registers (MCR1, MCR2, and MCR3), which can be programmed via the MPI 100 to direct data flow along subscriber selected bidirectional data paths shown functionally in FIG. 6 as busses 140 and 142.

D.1 Logical Bus Structure

Figure 7:
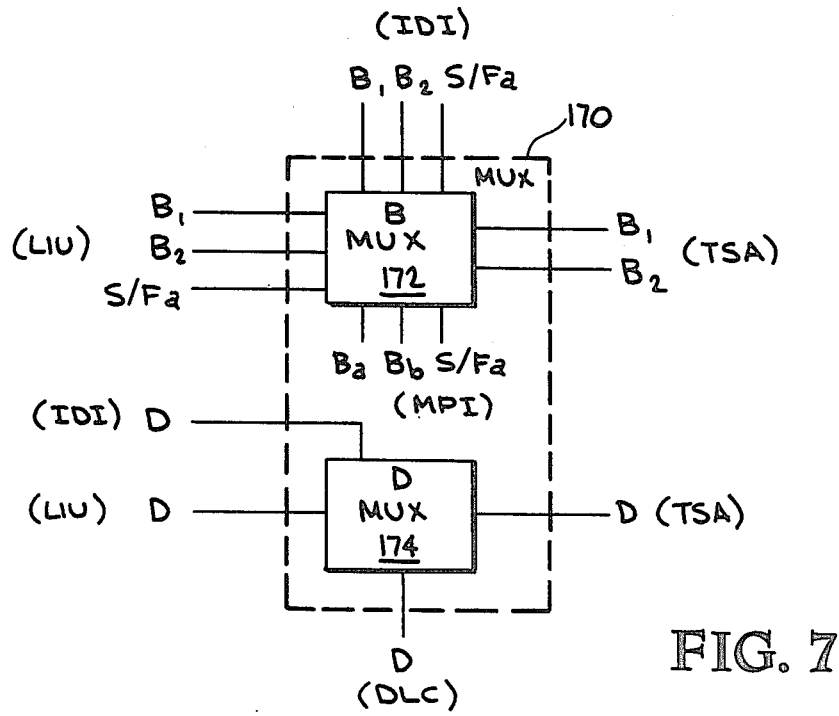
FIG. 7 illustrates the logical data bus structure internal to the DEC which can be configured by MUX 170 by programming from an external microprocessor 100.

The B-MUX portion 172 of MUX 170 can establish those bidirectional paths between the eleven MUX logical ports B1 (LIU), B2 (LIU), S/Fa (LIU), Ba (MPI), Bb (MPI), S/Fa (MPI), B1 (TSA) B2 (TSA), B1 (IDI) B2 (IDI), and S/FA (IDI), shown in FIG. 7, as controlled by the contents of MCR1, MCR2, and MCR3. The D-MUX portion 174 of MUX 170 can establish those bidirectional paths between the four MUX logical ports D(IDI), D(LIU), D(DLC) and of MCR1, MCR2 and MCR3.

These MCRs are externally programmed to connect any two of the eight logical B-channel ports together by writing an appropriate channel code into the corresponding MCR. Each of the MCR1, MCR2, and MCR3 receives a pair of four-bit channel codes, which, in accordance with Table IV, below, specifies the logical channel interconnections. For instance, the assignment to MCR1 of the channel codes 0001 and 0100 would establish a bidirectional channel connection of B1 (LIU) and Bb (MPI). A loopback connection can be established by assigning the same pair of channel codes to a particular MCR.

TABLE IV

| MCR1, MCR2, and MCR3 Channel Codes | |
|---|---|
| Code | Channel |
| 0000 | No connection |
| 0001 | B1 (LIU) |
| 0010 | B2 (LIU) |
| 0011 | Ba (MPI) |
| 0100 | Bb (MPI) |
| 0101 | B1 (TSA) |
| 0110 | B2 (TSA) |
| 0111 | B1 (IDI) |
| 1000 | B2 (IDI) |

The related, co-pending application referred to above contains a detailed description of the MCR1-4 registers and the manner and apparatus to affect the subscriber-selected data paths within MUX 170 and that description is hereby incorporated by reference.

D.2 Internal Physical Bus Structure

Figure 8:
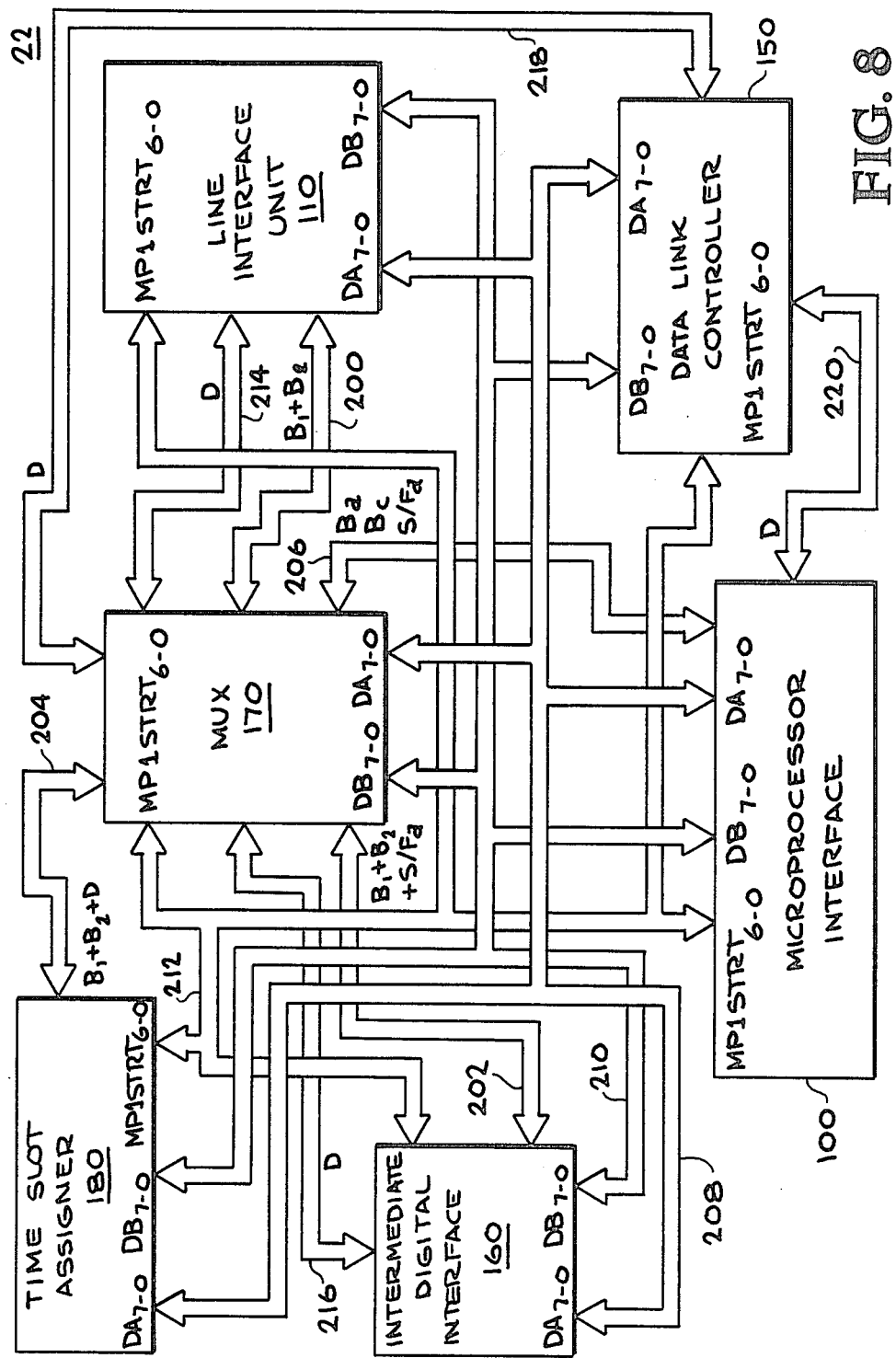
FIG. 8 illustrates the physical data bus structure internal to the DEC which can be configured by MUX 170 by programming from an external microprocessor 100.

The bus structure internal to the DEC 22, shown functionally as busses 140 and 142 on FIG. 6 is illustrated in FIG. 8. Shown thereon are the B-channel bidirectional data paths B1 and B2 (LIU); B1 and B2 (IDI); B1 and B2 (TSA); and Ba, Bb and S/FA (MPI) referred to in section D.1, above, designated 200, 202, 204 and 206, respectively, on FIG. 8. In addition, shown on FIG. 8 are three control busses 208, 210 and 212 which interconnect ports DA0-7, DB0-7 and MP1STRT0-6, respectively of the MPI 100 with the ports DA0-7, DB0-7 and MP1STRT0-6 of the LIU 100, the DLC 150, the IDI 160, the MUX 170 and the TSA 180.

The contents of the MCR1, MCR2, and MCR3 registers determines the particular interconnection implemented on data busses 200, 202, 204 and 206, as described in Section D.1, above, in accordance with Table IV. The manner in which the subscriber programs the MCR1, MCR2, and MCR3 registers, as well as the other user-accessible registers within the DSC 34 is described in Section E, below.

As shown in FIG. 8, LIU 110, IDI 160 and the DLC 150, portions of DEC 22 are connected via a data bus 214, 216 and 218, respectively, to MUX 170. These busses conduct the D-channel information from IDI 160 and LIU 110 to and from DLC 150. A bus 220 connects DLC 150 and MPI 100 and conducts D-channel information directly between these two elements.

E. The Microprocessor Interface

Figure 9:
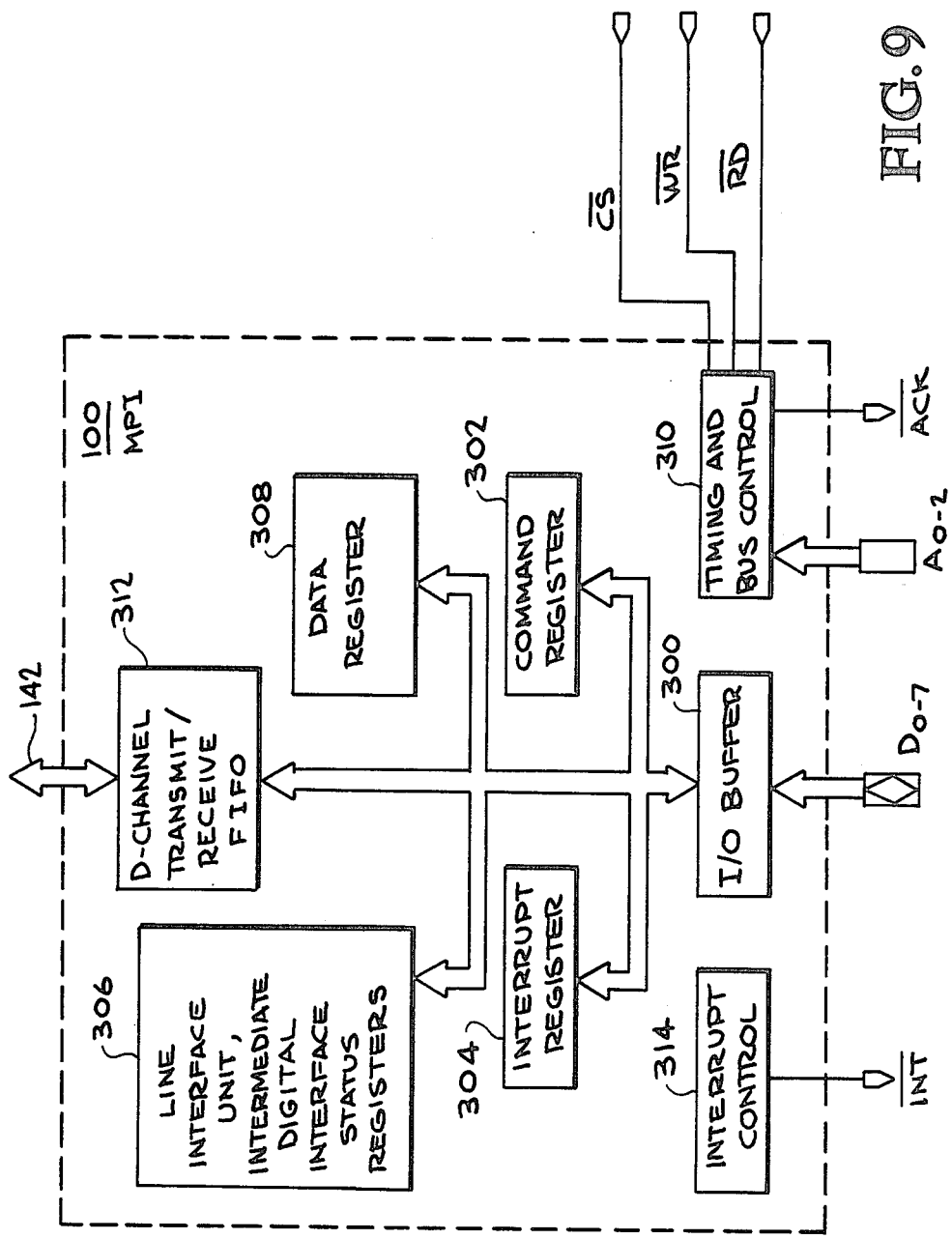
FIG. 9 is a block diagram of the microprocessor interface portion of the DEC.

The DEC 22 includes a number of programmable registers which can be accessed via the microprocessor interface (MPI) 100. FIG. 9 illustrates the internal structure of the MPI 100, which includes an input/output (I/O) buffer 300, a command register (CR) 302, an interrupt register (IR) 304, an LIU and IDI status registers (LSR and ISR) 306, a Data register (DR) 308 and a D-channel transmit/receive first-in first-out stack 312. The CR 302, IR 304, and DR 308 are user-accessible via the D0-7 terminals of the DEC 22 and the I/O Buffer 300.

The signals (H=HIGH signal level, L=LOW signal level, X=either HIGH or LOW signal level) the A0-2 address terminals and signals at a chip select ($\sim$CS), a read ($\sim$RD) enable, and a write ($\sim$WR) enable terminal of DSC 34 determine which register is to be accessed is in accordance with Table V, below, under control of the timing and bus control circuit 310. (As used herein, signals preceded by the symbol "$\sim$" are active LOW.) The logical bus 140 (FIG. 6) shown in FIG. 9 corresponds to the physical busses 204, 208 and 212 shown in FIG. 8 interconnecting the MPI 100 with the other elements of the DSC 34 shown in FIG. 8. Timing and bus control circuit 310 allocates these physical busses in accordance with Table VI, below as will be appreciated by those skilled in the art.

Table V refers to a number of so-called "direct" registers which reside in the MPI section of the DSC 34.

The transmit (TxD) and receive (RxD) buffers referred to on lines seven through twelve represent one of a number of buffers, shown generally on FIG. 9 as transmit/receive buffers 312, within the MPI 100.

The DSR 306, the DER 308 and the IR 304 are each eight-bit registers which are subscriber-accessible via the MPI 100. These registers are associated with the DLC 150 and their contents can be written by the DLC 150 and received by the MPC 38 via the MPI 100.

Table VI also refers to a number of so-called "indirect" registers which do not reside in the MPI 100 section of the DSC 34. The "Data Register" referred to on lines three and four, thereof, represents any of a number of programmable registers within the other sections of the DSC 34.

TABLE V

| | | | MPI 100 Direct Register Access | | | |
|---|---|---|---|---|---|---|
| CS | ~RD | ~WR | A[2] | A[1] | A[0] | Register(s) Accessed |
| L | H | L | L | L | L | CR, write only |
| L | L | H | L | L | H | IR, read only |
| L | H | L | L | H | L | Data Register, write |
| L | L | H | L | H | L | Data Register, read |
| L | L | H | L | H | H | LSR, read only |
| L | L | H | H | L | L | ISR, read only |
| L | H | L | H | L | H | Ba-channel TxD buffer, write only |
| L | L | H | H | L | H | Ba-channel RxD buffer, read only |
| L | H | L | H | H | L | Bb-channel TxD buffer, write only |
| L | L | H | H | H | L | Bb-channel RxD buffer, read only |
| L | H | L | H | H | H | S/FA TxD buffer, write only |
| L | L | H | H | H | H | S/FA RxD buffer, read only |
| H | X | X | X | X | X | No access |

Figure 10:
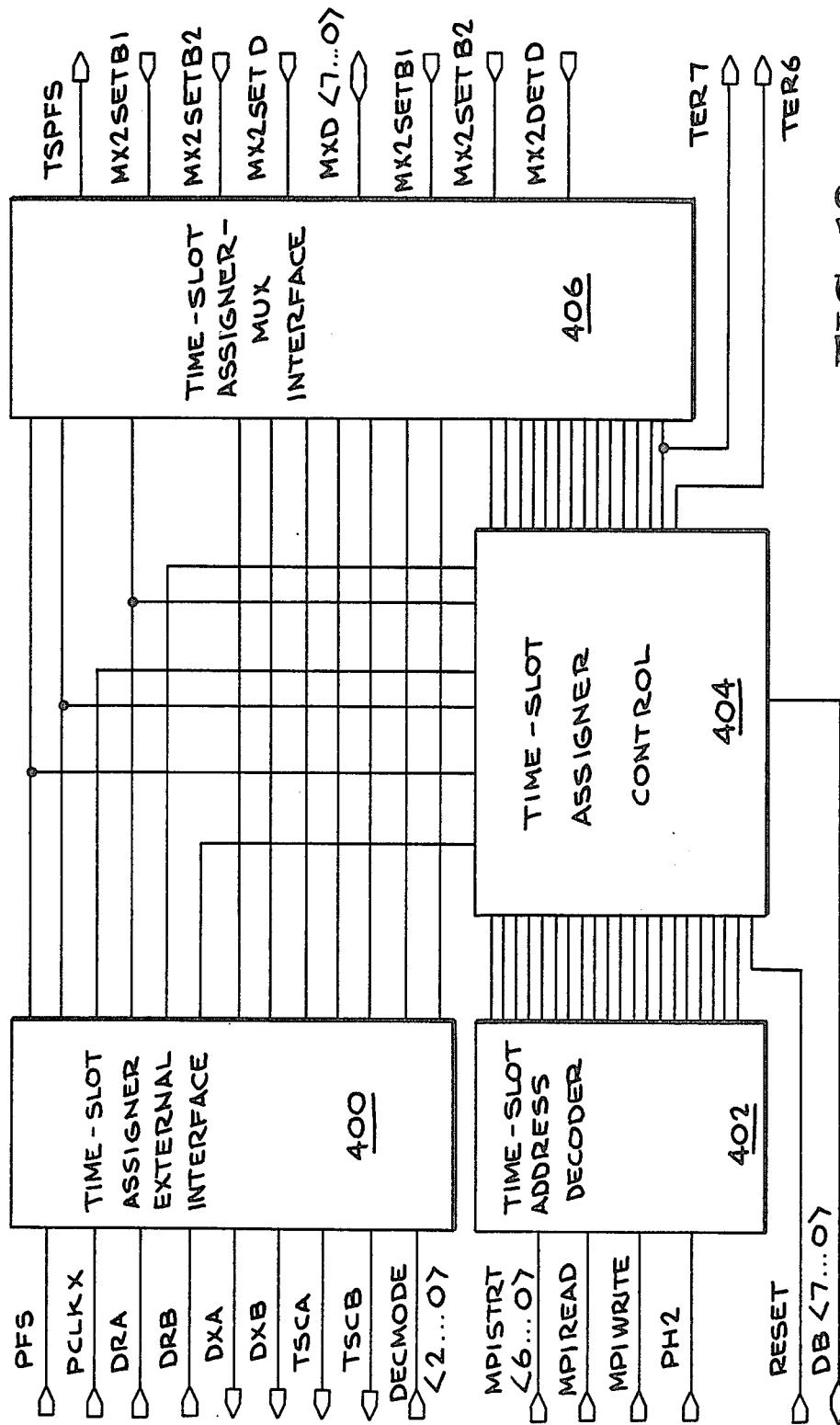
FIG. 10 illustrates the internal structure of the time-slot assigner of the instant invention.

The CR 302 consists of an eight-bit register as shown in FIG. 10. The CR 302 is subdivided into a three-bit (Y2, Y1, Y0) field containing the destination code field (DCF) and a five-bit (Z4, Z3, Z2, Z1, Z0) field containing the operational code field (OCF). The "Y" bits of the DCF define which section of the DEC 22 is to be accessed by the user via the MPI 100, in accordance with Table VI, below. The "Z" bits of the OCF define which Data Register(s) within the LIU 110, MUX 170 AND TSA 180 sections of the DEC 22 specified by the DCF of the eight-bit contents of the command register, in accordance with Table VII, below. (The registers within the remaining sections of DEC 22 are accessed in a fashion similar to that shown in Table VII, but will not be described herein.)

TABLE VI

| Destination Code Field of Command Register | | | |
|---|---|---|---|
| | DCF | | |
| Y2 | Y1 | Y0 | DEC Section |
| 0 | 0 | 1 | INIT/IR |
| 0 | 1 | 0 | LIU 110 |
| 0 | 1 | 1 | IDI 160 |
| 1 | 0 | 0 | TSA 180 |
| 1 | 0 | 1 | DLC 150 |
| 1 | 1 | 0 | MUX 170 |

TABLE VII

| | Operational Code Field of Command Register | | | | | |
|---|---|---|---|---|---|---|
| DEC Portion | Z4 | Z3 | Z2 | Z1 | Z0 | Filters and/or Data Register(s) Accessed |
| INIT | 0 | 0 | 0 | 0 | 1 | Read/Write INIT register |
| LIU 110 | 0 | 0 | 0 | 0 | 1 | Read/Write LMR1 |
| LIU 110 | 0 | 0 | 0 | 1 | 0 | Read/Write LMR2 |
| LIU 110 | 0 | 0 | 0 | 1 | 1 | Read/Write LMR1-2 |
| MUX 170 | 0 | 0 | 0 | 0 | 1 | Read/Write MCR1 |
| MUX 170 | 0 | 0 | 0 | 1 | 0 | Read/Write MCR2 |
| MUX 170 | 0 | 0 | 0 | 1 | 1 | Read/Write MCR3 |
| MUX 170 | 0 | 0 | 1 | 0 | 0 | Read/Write MCR4 |
| MUX 170 | 0 | 0 | 1 | 0 | 1 | Read/Write MCR1-4 |

TABLE VII-continued

| | Operational Code Field of Command Register | | | | | |
|---|---|---|---|---|---|---|
| DEC Portion | Z4 | Z3 | Z2 | Z1 | Z0 | Filters and/or Data Register(s) Accessed |
| TSA 180 | 0 | 0 | 0 | 0 | 1 | Read/Write TSB1X register |
| TSA 180 | 0 | 0 | 0 | 1 | 0 | Read/Write TSB1R register |
| TSA 180 | 0 | 0 | 0 | 1 | 1 | Read/Write TSB2X register |
| TSA 180 | 0 | 0 | 1 | 0 | 0 | Read/Write TSB2R register |
| TSA 180 | 0 | 0 | 1 | 0 | 1 | Read/Write TSDX register |
| TSA 180 | 0 | 0 | 1 | 1 | 0 | Read/Write TSDR register |
| TSA 180 | 0 | 0 | 1 | 1 | 1 | Read/Write CSR |
| TSA 180 | 0 | 1 | 0 | 0 | 0 | Read/Write DBO register |
| TSA 180 | 0 | 1 | 0 | 0 | 1 | Read/Write TER |
| TSA 180 | 0 | 1 | 0 | 1 | 0 | Read/Write all TSA registers |

The LIU status register (LSR), the LIU D-channel priority register (LPR) and the two LIU mode registers (LMR1 and LMR2) are programmable registers within the LIU 110 section of the DEC 22. The MCR1-4 registers were described above in section D.1 in connection with the logical B channels and the interrupt codes of the MUX 170. The time-slot registers for B1 channel transmit and receive (TSB1X, TSB1R), for B2 channel transmit and receive (TSB2X, TSB2R), for D channel transmit and receive (TSDX, TSDR), the clock slot register (CSR) and D-channel bit offset (DBO) register, and the transmit/reception enable register (TER) are programmable registers within the TSA 180 section of the DEC 22, and will be described in connection with the TSA 180 in Section F.

To read from or write to any of the indirect registers, i.e., those not within the MPI 100 as shown in the Direct Register Access Table V, a command word is first written to the CR 302. Depending on the contents of the DCF and OCF fields of the command word, in accordance with Tables VI and VII, one or more data bytes will be transferred to the register(s) selected.

F. Time Slot Assignor

The DEC 22 includes the Time-Slot Assigner (TSA) 180, of the instant invention, having the internal structure shown in FIG. 10. A time-slot assigner external interface (TSAEXT) portion 400 receives the PFS, PCLK PCM frame synchronization and clock signals, as well as the DRA and DRB data signals received from the A- and B-channels of the dual PCM highway 12. These signals are distributed to the other elements of the TSA 180 shown in FIG. 10. TSAEXT 400 generates DXA and DXB data signals onto the A- and B-channels of the dual PCM highway 12, and time-slot control (TSCA and TSCB) signals for the A- and B-channels of the dual PCM highway 12, as will be described hereinafter.

A time-slot address decoder (TSADDR) 402 receives a set of register address signals (MP1STRT) from the MPI 100 via bus 212 (FIG. 8). These signals, together with MP1READ and MP1WRITE and a phase-two clock (PH2) signal serve to generate signals which address the various registers within TSA 180, described above in connection with Table VII. This address decoding function is well-known to those skilled in the art and will not be described in further detail.

These addressable registers reside within a TSA control (TSACON) portion 404 of TSA 180. TSACON 404 also receives the PFS and PCLK signals from TSAEXT 400 and generates therefrom counting signals up to 1,024 for the "time-slot" and "clock-slot" value of the B1-, B2-, and D-channels. A "time-slot" is a group of seven bits used in the transmission or reception on one B-channel, one expanded D-channel or four standard D-channels. A "clock-slot" is a group of three bits indicating where the B- or D-channel data begins within the specified time-slot, and is referred to hereinafter as the "offset". Accordingly, a "clock slot" offset of zero to seven bits may be specified and will apply to all channels during reception or all channels during transmission; receive and transmit directions have separate clock slots. Accordingly, the TSA 180 is able to access the $128(=2^7)$ "time-slots" occurring after reception of the PCM frame synchronization (PFS) signal. In conjunction with the $8(=2^3)$ "clock-slots", a total of $1,024(2^7 2^3=2^{10})$ are uniquely addressable during every frame received or transmitted over the PCM highway 12.

Accordingly, a 10-bit register within TSACON 404 provides a 1,024 count. TSACON 404 generates a set of counting signals which are received by a time-slot assigner multiplexer (TSA-MUX) interface portion 406 of TSA 180. Since these various signals are determined by the contents of the TSB1X, TSB1R, TSB2X, TSB2R, TSDX, TSDR and CSR user-programmable registers described in connection with Table VII, above, the user can specify up to 128 possible time-slots at the PCM interface. Since the PCM highway 12 operates at speeds up to 8.192 Mbps, this allows the user up to 128 possible time slots at 64 kbps without blocking. During each PCM frame, two 64 kbps B-channels (8-bit time-slots) and one 16 kbps or one 64 kbps D-channel (2- or 8-bit time-slot) may be transmitted or received over the PCM highway 12.

The TSA-MUX interface 406 portion of TSA 180 also receives the DRA, DRB, PCLK and PFS signals from the TSAEXT 400 as well as time-division multiplexed signals on the B1- and B2-channels from MUX 170 via bus 204 (FIG. 8) and D-channel data from DLC 150 via bus 216 (FIG. 8). TSA-MUX interface 406 also receives a set of sense signals MX2SETB1, MX2SETB2, and MX2SETD, and data enable signals MX2DETB1, MX2DETB2, and MX2DETD from MUX 170 used by the TSA-MUX 406 for processing the B1-, B2-and D-channel data, respectively, as will now described.

Figure 11A:
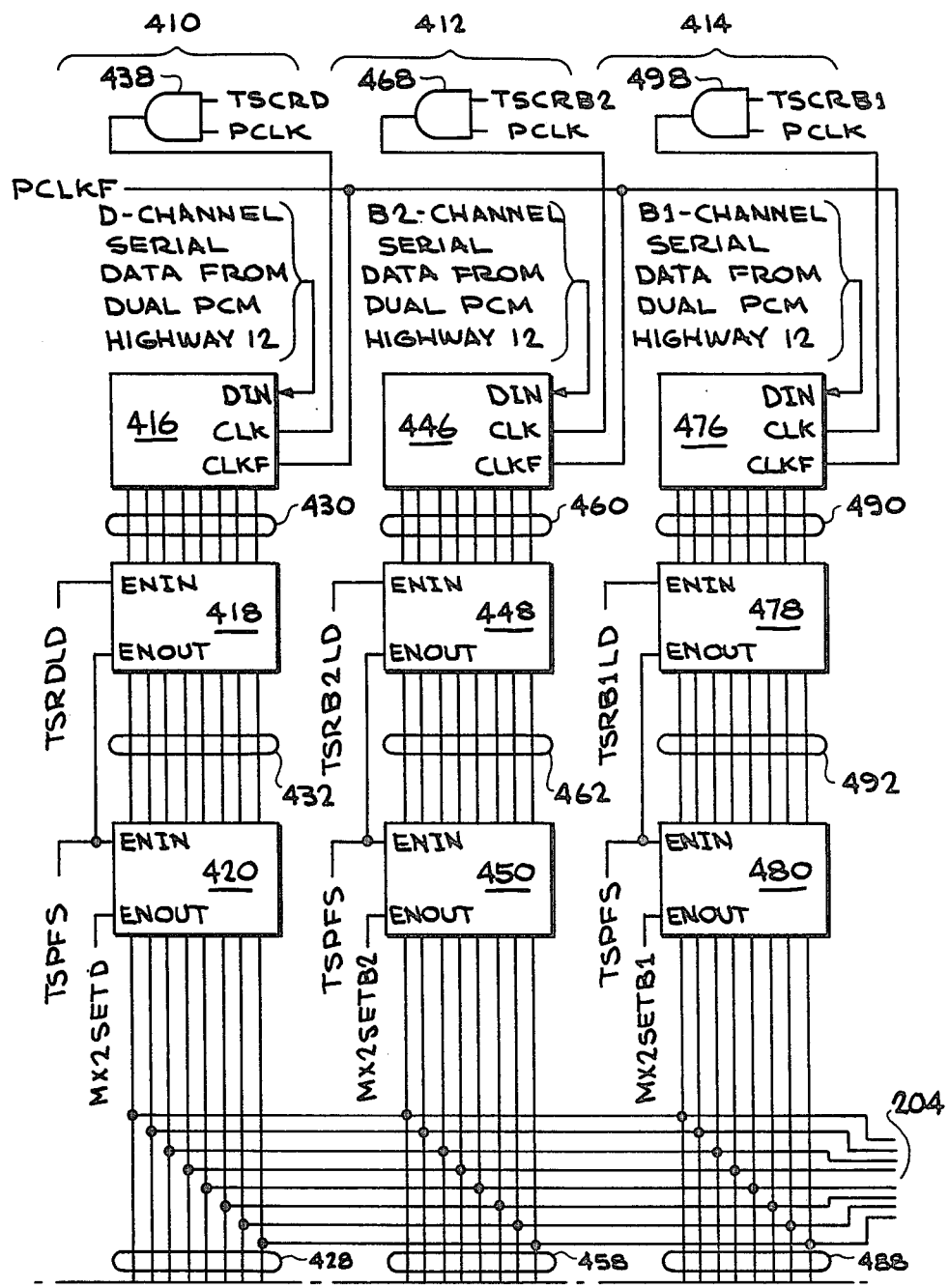
FIG. 11 is a logic diagram of the interconnect matrix portion of the time-slot assigner-multiplexer (TSA-MUX) of the TSA of the present invention.
Figure 11B:
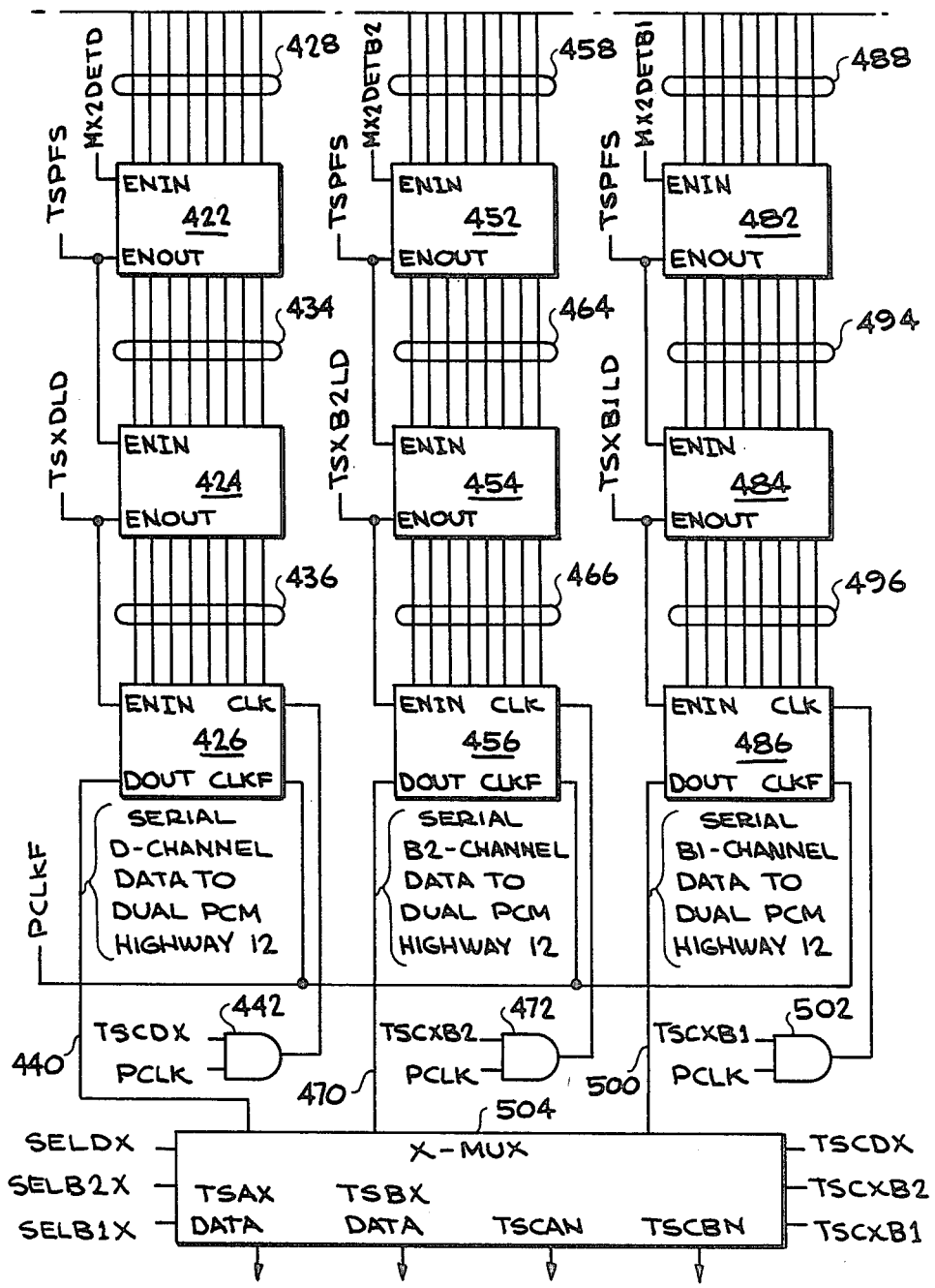

With reference to FIG. 11, the TSA-MUX interface 406 of the present invention includes an interconnect matrix portion 408 comprising three major sections generally denoted 410, 412 and 414 thereon. The portion of the interconnect matrix denoted 410 comprises the D-channel interconnection to the MUX 170 via bus 204 (FIG. 8) that denoted 412 comprises the B2-channel interconnection, and that denoted 414 comprises the B1-channel interconnection.

As shown in FIG. 11, the D-channel interconnection portion 410 includes a serial-to-parallel register 416, a set of four eight-bit registers 418, 420, 422 and 424, a parallel-to-serial register 426. The eight read terminals (outputs) of register 420 are connected in parallel to the eight write terminals (inputs) of register 422 by eight signal lines collectively denoted 428. The eight signal lines 428 connect in a parallel manner to the eight bidirectional signal lines of bus 204. The eight write terminals (inputs) of registers 418, 422, 424, and 426 are connected in parallel to the eight read terminals (output) of registers 416, 418, 422, and 424, respectively, via eight signal lines collectively denoted 430, 432, 434 and 436, respectively. Registers 416, 418 and 420, and registers 422, 424 and 426 form a three-stage serial-in, parallel-out source buffer; parallel-in, serial-out destination buffer, respectively.

Serial-to-parallel register 416 receives at an input terminal (DIN) the incoming serial data from either the A- or B-chennel of the PCM highway 12. Selection circuitry (not shown) permits the user, via MPI 100 and TSACON 404, to select the source of data for the D-channel interconnection portion 410. At a first clock input terminal CLK of register 416 a time-slot control receive D-channel TSCRD signal generated by a timing portion of TSA-MUX 406 is applied via an AND gate 438 which receives the PCM synchronizing clock signal PCLK to provide synchronization for the writing of the serial signals applied to the DIN input terminal of register 416. At a second clock input terminal (CLKF) of register 416, the synchronizing clock signal PCLKF generated by TSAEXT 400 is applied.

A time-shifted pseudo frame synchroniation TSPFS signal generated by the timing portion of TSA-MUX 406 is received at an enable output (ENOUT) terminal of register 410 and an enable input (ENIN) terminal of register 420. A TSRDLD signal generated by the timing portion of TSA-MUX 406 is received at an ENIN terminal of register 416. The MX2SETD signal generated by the MUX 170 is received at an ENOUT terminal of register 420.

The MX2DETD signal generated by MUX 170 is applied to an ENIN terminal of register 422, the TSPFS signal is applied to the ENOUT and ENIN terminals of registers 422 and 424, respectively, and a TSLDLD signal generated by the timing portion of TSA-MUX 406 is applied to the ENOUT and ENIN terminals of registers 424 and 426, respectively. Signals are generated at a serial data out (DOUT) terminal of register 426 which are conducted on a signal line 440 to the dual PCM highway 12, under control of the synchronization signal. PCLKF applied to a CLKF terminal of register 426 and a signal applied to a CLK terminal of register 426, which latter signal is generated by an AND gate 442 receiving a TSCXD signal generated by the timing portion of TSA-MUX 406 and the PCLK signal.

As will be described hereinafter in connection with the timing diagrams of FIG. 12, the D-channel interconnect matrix 410 coordinates timing of the asynchronous data sources at the "S" interface 32 and the dual PCM highway 12 of DEC 22 so as to generate therefrom on signal line 440 a single synchronous data stream with no "slip" or loss of data.

As shown in FIG. 11, the B2-channel interconnection portion 412 includes a serial-to-parallel register 446, a set of four eight-bit registers 448, 450, 452 an 454, a parallel-to-serial register 456. The eight read terminals (outputs) of register 450 are connected in parallel to the eight write terminals (inputs) of register 452 by eight signal lines collectively denoted 458. The eight signal lines 458 connect in a parallel manner to the eight bidirectional signal lines of bus 204. The eight write terminals (inputs) of register 448, 452, 454 and 456 are connected in parallel to the eight read terminals (output) of registers 446, 448, 452, and 454, respectively, via eight signal lines collectively denoted 460, 462, 464 and 466, respectively. Registers 446, 448 and 450, and registers 452, 454 and 456 form a three-stage serial in, parallel-out source buffer; parallel-in, serial-out destination buffer, respectively.

Serial-to-parallel register 446 receives at a input terminal (DIN) the incoming serial data from either the A- or B-channel of the PCM highway. Section circuitry (not shown) permits the user, via MPI 100 and TSA-CON 404, to select the source of data for the B2-channel interconnection portion 412. At a first clock input terminal CLK of register 446 a (time-slot control read D-channel) TSCRB2 signal generated by a timing portion of TSA-MUX 406 is applied via an AND gate 468 which receives the PCM synchronizing clock signal PCLK to provide synchronization for the writing of the serial signals applied to the DIN input terminal of register 446. At a second clock input terminal (CLKF) of register 446, the synchronizing clock signal PCLKF generated by TSAEXT 400 is applied.

A (time-slot pseudo frame synchronization) TSPFS signal generated by the timing portion of TSA-MUX 406 is received at an enable output (ENOUT) terminal of register 448 and an enable input (ENIN) terminal of register 450. A TBRB2LD signal generated by the timing portion of TSA-MUX 406 is received at an ENIN terminal of register 446. The MX2SETB2 signal generated by the MUX 170 is received at an ENOUT terminal of register 450.

The MX2DETB2 signal generated by MUX 170 is applied to an ENIN terminal of register 452, the TSPFS signal is applied to the ENOUT and ENIN terminals of registers 452 and 454, respectively, and a TSXB2LD signal generated by the timing portion of TSA-MUX 406 is applied to the ENOUT and ENIN terminals of registers 454 and 456, respectively. Signals are generated at a serial data out (DOUT) terminal of register 456 which are conducted on a signal line 470 to the dual PCM highway 12, under control of the synchronization signal. PCLKF applied to a CLKF terminal of register 456 and a signal applied to a CLK terminal of register 456, which latter signal is generated by an AND gate 472 receiving a TSCXB2 signal generated by the timing portion of TSA-MUX 406 and the PCLK signal.

As will be described hereinafter in connection with the timing diagrams of FIG. 12, the B2-channel interconnect matrix 412 coordinates timing of the asynchronous data sources at the "S" interface 32 and the dual PCM highway 12 of DEC 22 so as to generate therefrom on signal line 470 a single synchronous data stream with no "slip" or loss of data.

As shown in FIG. 11, the B1-channel interconnection portion 414 includes a serial-to-parallel register 476, a set of four eight-bit registers 478, 480, 482 and 484, a parallel-to-serial register 486. The eight read terminals (outputs) of register 480 are connected in parallel to the eight write terminals (inputs) of register 482 by eight signal lines denoted collectively 488. The eight signal lines 488 connect in a parallel manner to the eight bidirectional signal lines of bus 204. The eight write terminals (inputs) of registers 478, 482, 484 and 486 are connected in parallel to the eight read terminals (output) of registers 476, 478 and 484, respectively, via eight signal lines collectively denoted 490, 492, 494 and 496, respectively. Registers 476, 478 and 480, and registers 482, 484 and 486 form a three-stage serial-in, parallel-out source buffer; parallel-in, serial-out destination buffer, respectively.

Serial-to-parallel register 476 receives at an input terminal (DIN) the incoming serial data from either the A- or B- channel of the PCM highway 12. Selection circuitry (not shown) permits the user, via MPI 100 and TSACON 404, to elect the source of data for the B1-channel interconnection portion 414. At a first clock input terminal CLK of register 476 a (time-slot control read D-channel) TSCRB1 signal generated by a timing portion of TSA-MUX 406 is applied via an AND gate 498 which receives the PCM sychronizing clock signal PCLK to provide synchronization for the writing of the serial signals applied to the DIN input terminal of register 476. At a second clock input terminal (CLKF) of register 416, the synchronizing clock ginal PCLKF generated by TSAEXT 400 is applied.

A (time-slot pseudo frame synchronization) TSPFS signal generated by the timing portion of TSA-MUX 406 is received at an enable output (ENOUT) terminal of register 478 and an enable input (ENIN) terminal of register 480. A TBRB1LD signal generated by the timing portion of TSA-MUX 406 is received at an ENIN terminal of register 476. The MX2SETB1 signal generated by the MUX 170 is received at an ENOUT terminal of register 480.

The MX2DETB1 signal generated by MUX 170 is applied to a ENIN terminal of register 482, the TSPFS signal is applied to the ENOUT and ENIN terminals of registers 482 and 484, respectively, and a TSXB1LD signal generated by the timing portion of TSA-MUX 406 is applied to the ENOUT and ENIN terminals of registers 484 and 486, respectively. Signals are generated at a serial data out (DOUT) terminal of register 486 which are conducted on a signal line 500 to the dual PCM highway 12, under control of the synchronization signals. PCLKF applied to a CLKF terminal of register 486 and a signal applied to a CLK terminal of register 486, which latter signal is generated by an AND gate 502 receiving a TSCXB1 signal generated by the timing portion of TSA-MUX 406 and the PCLK signal.

As will be described hereinafter in connection with the timing diagrams of FIG. 12, the B1-channel interconnect matrix 414 coordinates timing of the asynchronous data sources at the "S" interface 32 and the dual PCM highway 12 of DEC 22 so as to generate therefrom on signal line 500 a single synchronous data stream with a no "slip" or loss of data.

Finally, shown in FIG. 11 is a transmit multiplexer (X-MUX) 504 which receives the D-channel, B2-channel and B1-channel via signal lines 440, 470 and 500 respectively from D-channel interconnect matrix 410, B2-channel interconnect matrix 412 and B1-channel interconnect matrix 414, respectively. X-MUX 504 also receives the TSCDX, TSCXB2 and TSCXB1 timing signals and a set of select signals SELDX, SELB2X and SELB1X generated by the TSA-CON 404. The latter signals serve to allow user-selection of the D-, B2- or B1-channel data, respectively, which will be generated at a TSAXDATA or a TSBXDATA output terminals of TSA-MUX 406, which terminals are connected to the TSAEXT 400 for generation thereby on DXA or DXB terminals of the TSA 180.

At a pair of output terminals TSCAN and TSCBN of X-MUX 504, the time slot control A and B TSCA and TSCB signals are generated. These signals are conducted to the TSAEXT 400 generation thereby at the terminals of TSA 180.

G. TSA-MUX Timing

Figure 12:
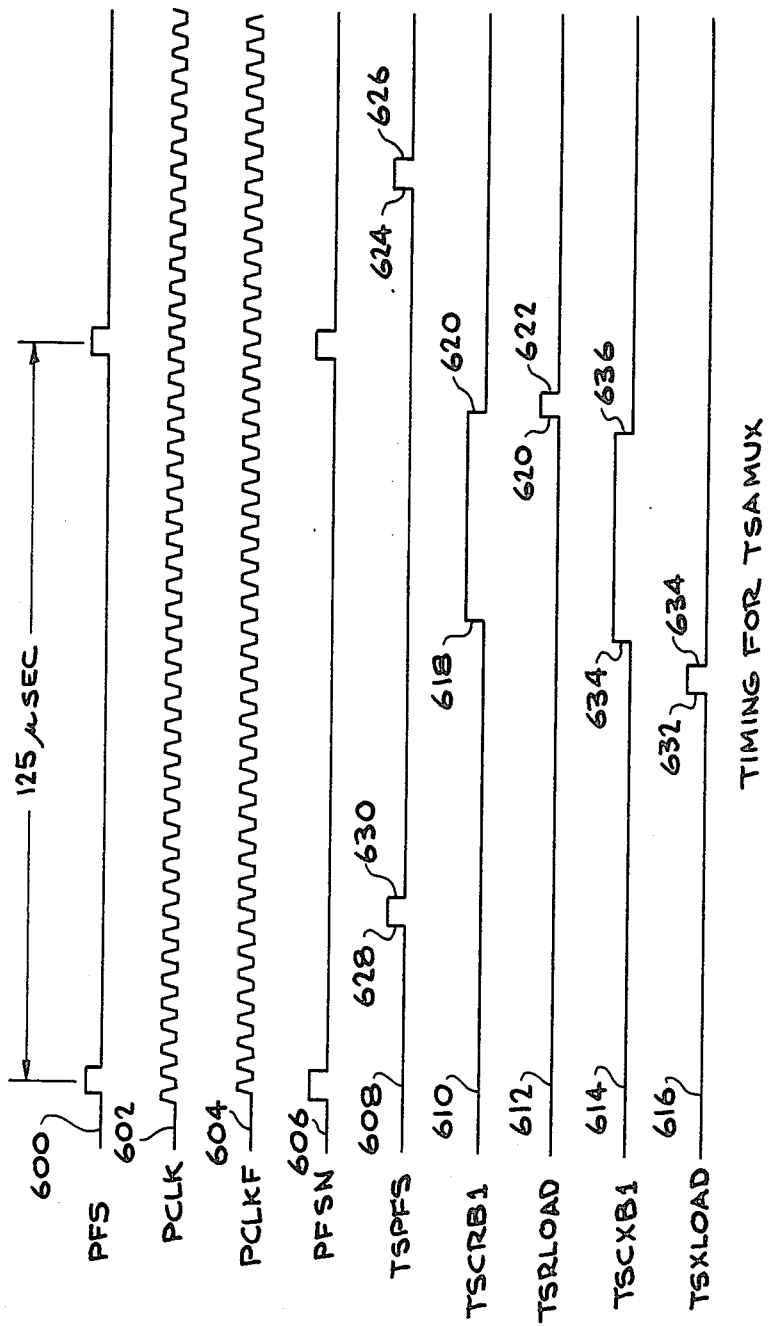
FIG. 12 is a diagram of the timing external to the TSA-MUX portion of the TSA of the present invention.

FIG. 12 is a timing diagram of the interconnect matrix 408 of the TSA-MUX interface 406, illustrated in FIG. 11. The pseudo frame synchronization (PFS) signal waveform 600, repeating at a 8 KHz frequency, is recovered from the dual PCM highway 12 by the timing portion of the TSA-MUX 406. The PCM clock (PCLK) signal waveform 602 is a high-speed clock, running between 64 KHz and 8.192 MHz, as determined by the number of "time slots" selected by the user up to 128. A PCM clock fall (PCLKF) signal waveform 604 is generated by the TSAEXT 400 from the PCLK signal having a specified delay in time therefrom. A pseudo frame synchronization normalized (PFSN) signal waveform 606 is generated by the TSAEXT 400 from the PFS signal having a specified delay in time therefrom. The time-shifted PFS (TSPFS) signal waveform 608 is generated from the PFS signal by the timing portion of the TSA-MUX 406 and is shifted 8 PCLK clock periods relative to the frame synchronization signal so that a full frame can be recognized even when the user specifies the maximal "clock slot" offset of seven. A time-slot control receive B1-channel (TSCRB1) signal waveform 610 is generated by the TSACON 404, and a time-slot receive load (TSRLOAD) signal waveform 612 is also generated by TSACON 404. A time-slot control transmit B1-channel (TSCXB1) signal waveform 614 and a time-slot transmit load (TSXLOAD) signal 616 waveform are also generated by TSACON 404.

As described earlier, a user can cause up to 1,024 PCLK pulses in waveform 602 to occur within a single 125 sec (8 KHz) period of the PFS waveform 600. Shown in FIG. 12 are 32 such PCLK pulses, for illustration. The PCLKF waveform 604 and the PFSN waveforms are shown delayed by a specified amount with respect to the PFS and PCLK waveforms 600 and 602. The TSPFS waveform 608 is shown in FIG. 12 delayed by eight time slots, i.e., eight cycles of the PCLK 602.

To illustrate the operation of the TSA-MUX interconnect matrix 408, an explanation of the B1-channel interconnect portion 414 will now be presented in connection with the timing diagram of FIG. 12; however, the explanation applies equally to the B2-channel and D-channel interconnect portions 412 and 410.

When the TSCRB1 waveform 610 rises (618), eight bits are serially loaded into register 476 (FIG. 11), clocked by the eight PCLK pulses shown occurring in waveform 602 between the rise 618 and its fall (620). When the TSRLOAD waveform 612 rises 620, these eight bits are transferred in parallel to the register 478 during the one period of PCLK 602 until TSRLOAD falls (622). At the rise (624) of TSPFS waveform 608, the contents of register 478 are transferred in parallel to the register 480. Since the transfer is in parallel, TSPFS waveform 608 falls (626) after one period of PCLK 602. Reception by register 480 of the MX2SETB1 signal from MUX 170 then causes the contents of register 480 to be conducted in parallel along bus 204 to the MUX 170.

In this manner, B1-channel data synchronized to the PCM highway 12 becomes synchronized to the PFS timing signal generated by TSA 180 and received by all the other elements of the DEC 22 shown in FIG. 8. For instance, MUX 170 receives the PFS signal and coordinates its generation of the MX2SETB1 timing signal so as to be prepared for reception of data along the bus 204. The application of the TSPFS timing signal to registers 478 and 480 assures that even with a maximum offset of seven, a full frame of data will be serially received by register 476 from the B1-channel before the final loading of register 480.

Reception of the MX2DETB1 by register 482 and subsequent rise (628) of the TSPFS waveform 608 similarly transfers B1-channel data from MUX 170 via bus 204 in parallel to register 484. The loading of register 484 occurs prior to the fall (630) of waveform 608. When the TSXLOAD waveform 616 rises (632), the eight bits are loaded into register 486 from register 484, the loading occuring prior to the fall (634) of waveform 616. The TSCXB1 waveform 614 rises (634) and the eight bits are serially transferred from register 486, clocked by the eight PCLK pulses shown occurring in waveform 602 between the rise 634 and the fall (636) of waveform 614.

In this manner, B1-channel data synchronized to the PFS timing signal becomes synchronized to the PCM highway 12 for transmission. The X-MUX 504 (FIG. 11) receives timing signals TSCDX, TSCXB2, TSCXB1 generated by the TSACON 404 so that the frame structure illustrated in FIG. 2 can be maintained, as will be appreciated by those skilled in the art.

We claim:
1. In a digital exchange controller having:
a Station ("S") interface operably connected to analog and digital subscriber devices,
a dual PCM highway interface operably connected to a programmable time-slot assigner multiplexer,
a plurality of subscriber-accessible internal function means, including at least
line interface means for connecting said "S" interface to a data-routing multiplexer means, and
data-routing multiplexer means, connected to each of said plurality of internal function means, for establishing data paths for signals present at said "S" interface, between subscriber-selected source and destination of said internal function means, and
control logic and microprocessor means, connected to said data-routing multiplexer means, responsive to subscriber commands for generating control signals representative of said subscriber-selected source-destination combinations;
a programmable time-slot assigner multiplexer, connected to said data-routing multiplexer means, including
means for bidirectional interconnection of said data-routing multiplexer means and said dual PCM highway interface, comprising:
clock means for generating a plurality of internal timing signals, responsive to a frame synchronization clock signal received at said PCM interface;
at least one source buffer means, connected to said data-routing multiplexer, responsive to predetermined ones of said internal timing signals, for receiving time-division multiplexed serial data signals from said dual PCM highway interface and generating therefrom plural-bit parallel signals to said data-routing multiplexer; and
at least one destination buffer means, connected to said data-routing multiplexer, responsive to predetermined ones of said internal timing signals, for receiving plural-bit parallel signals from said data-routing multiplexer and generating therefrom serial data signals.

2. A programmable time-slot assigner multiplexer according to claim 1 further including means for generation of timing signals synchronized to said signals received at said PCM interface, responsive to said PCM frame synchronization clock signal.

3. A programmable time-slot assigner multiplexer according to claim 2 further including means responsive to said timing signals for adapting the rate at which data signals received at said PCM highway are transferred to and from said "S" interface.

4. A programmable time-slot assigner multiplexer according to claim 1 wherein each said source buffer means comprises:
- a serial-in, parallel-out register receiving said time-division multiplexed PCM serial data signals and predetermined ones of said internal timing signals;
- a first plural-bit parallel-in, parallel-out storage register responsive to said first synchronizing clock receiving in parallel data signals from said first serial-to-parallel register and receiving predetermined ones of said internal timing signals; and
- a second plural-bit parallel-in, parallel-out storage register receiving in parallel data signals from said first plural-bit storage register and receiving predetermined ones of said interval timing signals.

5. A programmable time-slot assigner multiplexer according to claim 1 wherein said destination buffer means comprises:
- a third plural-bit parallel-in, parallel-out storage register, responsive to said second synchronizing clock, receiving in parallel data signals from said data-routing multiplexer and predetermined ones of said internal timing signals;
- a fourth plural-bit parallel-in, parallel-out storage register receiving in parallel data signals from said third storage register and receiving predetermined ones of said internal timing signals; and
- a parallel-in, serial-out register receiving in parallel data signals from said fourth storage register and receiving predetermined ones of said internal timing signals.

6. A programmable time slot assigner multiplexer according to claim 4 wherein said signal from said dual PCM highway includes at least a first, a second, and a third time-division multiplexed channel, said time-slot assigner-multiplexer having three source buffers, each corresponding to a predetermined one of said three time-division multiplexed channels.

7. A programmable time-slot assigner multiplexer according to claim 5 where said signal from said dual PCM highway includes at least a first, a second, and a third time division multiplexed channel, said time-slot assigner multiplexer having three destination buffers, each corresponding to a predetermined one of said three time-division multiplexed channels.

8. A programmable time-slot assigner multiplexer according to claim 1 further including a transmit multiplexer means receiving said serial data signals generated by said destination buffer means and receiving predetermined ones of said internal timing signals for generating serial time-division multiplexed signals therefrom.

* * * * *